W. F. PETERSEN.
BAKER'S OVEN.
APPLICATION FILED MAR. 26, 1921.

1,435,975.

Patented Nov. 21, 1922.
2 SHEETS—SHEET 1.

Inventor
William F Petersen
By Frank D Thomason
Attorney.

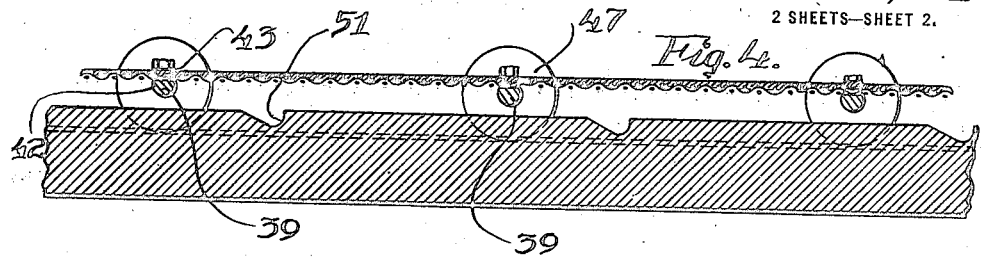
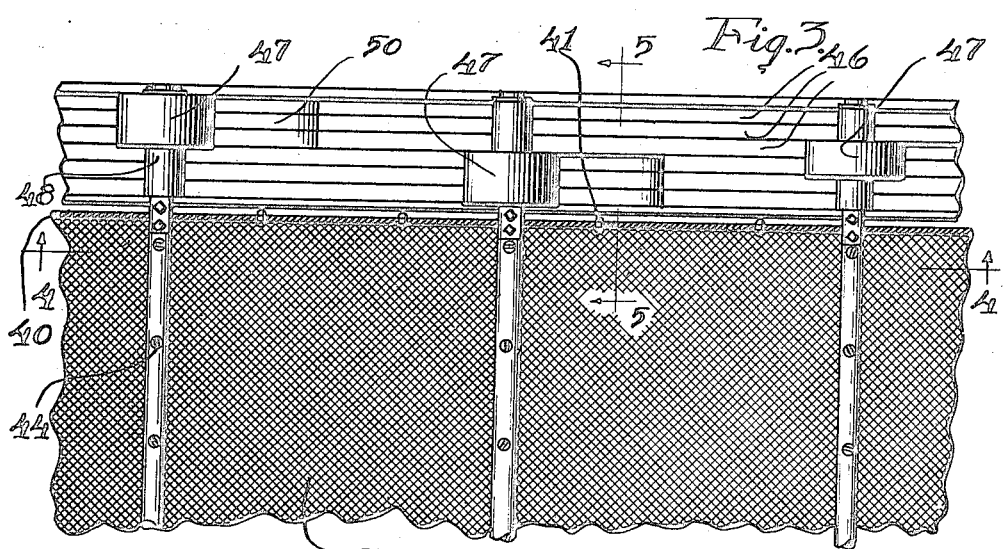
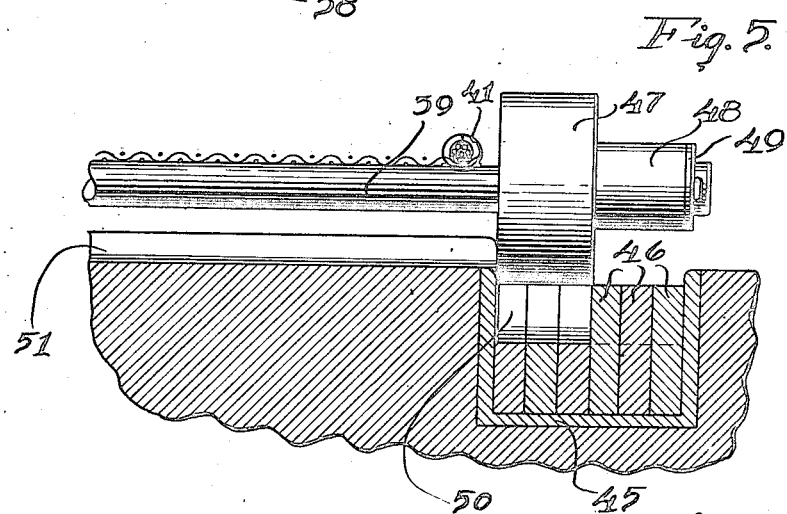

Patented Nov. 21, 1922.

1,435,975

UNITED STATES PATENT OFFICE.

WILLIAM F. PETERSEN, OF CHICAGO, ILLINOIS.

BAKER'S OVEN.

Application filed March 26, 1921. Serial No. 455,797.

*To all whom it may concern:*

Be it known that I, WILLIAM F. PETERSEN, a citizen of the United States, residing at Chicago, in the county of Cook and State of Illinois, have invented certain new and useful Improvements in Bakers' Ovens, of which the following is a full, clear, and exact description.

The object of this invention is to hasten the baking of bakery products and to do this without changing the general construction of the type of bakers' ovens to which my improvements are applicable, and without increasing the heat generating features of the same.

More specifically the invention consists in bringing the means employed to carry the bakery products into such intimate relation with the heated hearth of the baking chamber of the oven as to practically eliminate the air space between said means and the hearth and thus enable said products to get nearer the hottest part of said chamber and bake sooner and then to raise said means and bakery products above said hearth while the same are being withdrawn from said chamber to provide an air space under the same that will prevent the underside of said products from burning while being withdrawn.

A more concrete understanding of my invention may be obtained from the following detailed description taken in connection with the accompanying drawings, in which—

Figure 3 is a fragmental enlarged top plan of the conveyor and trackway.

Figure 4 is a longitudinal section taken on line 4, 4, Figure 3, looking in the direction of the arrows.

Figure 5 is a section taken on line 5, 5, of Figure 3, looking in the direction of the arrows.

Figure 1:
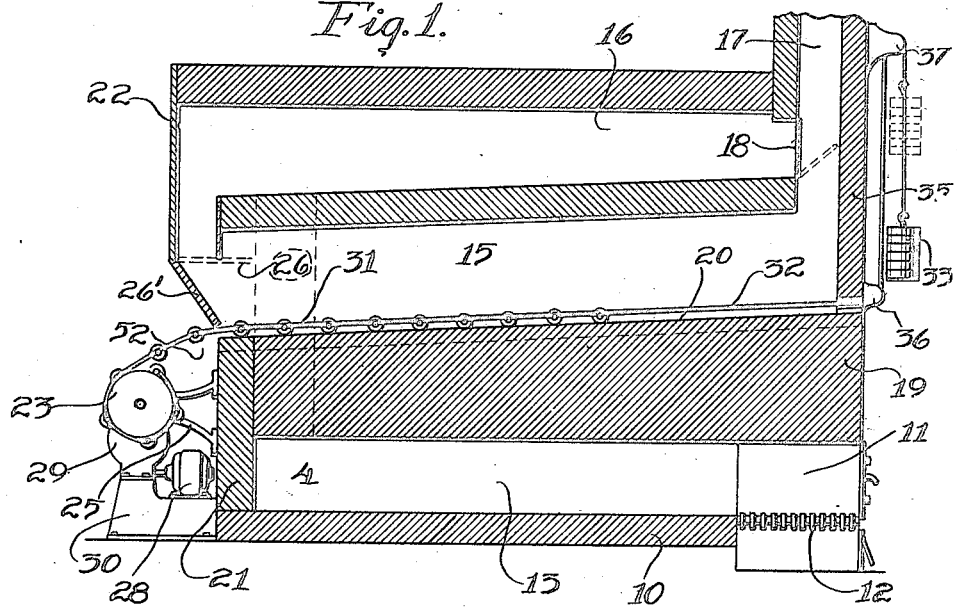
Figure 1 is a vertical longitudinal section through an oven comprising the improvements of my invention.
Figure 2:
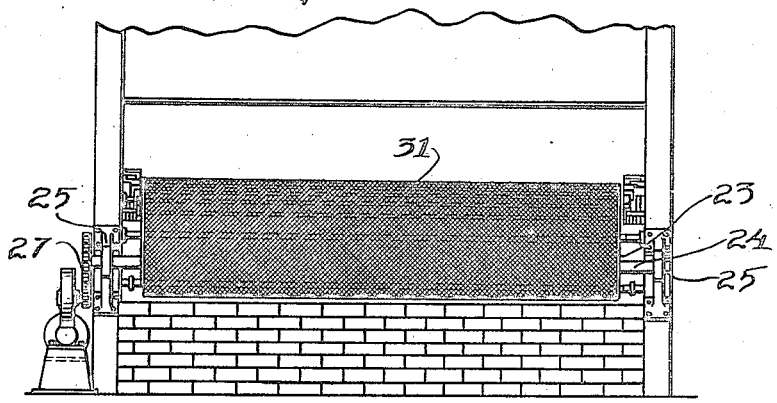
Figure 2 is a front elevation of the same partly broken away.

Referring more particularly to the drawings, 10 is the heat generating chamber of the oven, the rear end thereof having a furnace 11 provided with the conventional grate-bars 12. A flue 13 extends upward from this chamber 10 and is provided with two vertical passages 14, that extend up through the side-walls of the oven on each side of the baking-chamber 15 of the oven to a top flue 16, that extends rearwardly over chamber 15 and communicates at its rear end with an outlet 17 for the discharge of the products of combustion. The baking chamber 15 communicates with outlet 17 and a damper 18 is mounted in the entranceway of the baking-chamber for restricting the escape of heat from the front of the oven.

The hearth 19 of the baking-chamber 15 has a surface preferably inclined upward from its front to its rear end, and a conveyor is adapted to move longitudinally thereon as will hereinafter be more fully explained.

Referring specifically to the mechanism constituting my invention, I provide a drum 20, carried on a transverse shaft 21 supported in suitable bearings 22, 22, mounted below and on both sides of the inlet opening 23 of the baking-chamber.

The shaft 21 is driven through a reduction gearing 24 by an electric motor 25; the motor being connected with the reduction gear by a worm and worm-gear carried in the housing 26, which latter is mounted as a unit on a suitable base 27.

The conveyor hereinbefore referred to consists of an articulated tray portion 28, which is secured at one end to the drum 20. This tray portion has its side edges connected by cables 29, that pass through an opening 30 in the rear wall 31 of the oven and then up over suitable sheaves 32 and 33, said cables having a common weight 34 connected to the rear pendent ends thereof.

The driving device, as represented by the motor 25, is adapted to operate in both directions; the conveyor being drawn into the oven by means of the weight 34, and drawn out of the oven by means of the motor. A door 23' controls the inlet opening 23.

The conveyor, or apron, preferably consists of a series of transversely elongated trays 35, of corresponding dimensions, composed preferably, of wire screening 36, the transverse edges of which are suitably secured by rivets or otherwise to transverse bars 37, 37, that are of such length that their ends extend beyond the side edges of the conveyor.

The longitudinal edges of the screening of the trays are selvaged by the cables 29, hereinbefore described, one of which is best shown in Figures 3 and 5. Referring to Figure 5, it will be noted that the margin of the wire mesh extends about the cable 29, and a suitable staple 39 binds the cable and mesh together. A plurality of these staples are provided throughout the length of the conveyor as will be observed from Figure 3. These cables extend the full length of the conveyor and their rear portions continue beyond the rear end of the conveyor and are weighted as hereinbefore explained. Where these cables cross bars 40, the bars are flattened and the cables are secured thereto as at 41, by means of strips 42, these strips in turn being secured by machine screws 43 passing through the strips and into said bars.

The ends of the bars projecting beyond the sides of the conveyor, are formed into journals or arms on which metal wheels 44, are journaled and these wheels travel on depressed longitudinal trackways. The construction of these trackways is best shown in Figures 3 and 5, of the drawings.

These trackways are built up from a number of longitudinally disposed laminated metallic strips 45 which stand on edge and are clustered together and held in close contact in any suitable manner and occupy the troughs that extend alongside of and are coterminous with the hearth.

The wheels 44, are of less width than said strips 42, and are mounted on the journals of each bar 40, and either revolve thereon in a different longitudinal vertical plane from the wheels journaled on the other bars, or they are of greater width than said strips and staggered with relation to the other wheels. The strips of the trackway are provided with as many depressed seats 46, of relatively varying widths that are so located that when the conveyor is at the limit of its rearward movement, the wheels will drop into said heats, and thus lower the conveyor until the screening of the trays lie flat upon the hearth.

The hearth is provided with a plurality of depressions 48 complemental to the depressions 49, and arranged to accommodate the axles 50 when the rollers 51 seat in their respective depressions.

The trackways extend beyond the forward end of the oven as indicated at 52, and terminate close to the drum which latter, however, is sufficiently spaced therefrom so as not to interfere with the winding of the conveyor thereon.

In operation the articles to be baked are placed on the conveyor after the same is slowly started by the motor into the baking-chamber. The weight 34 serving to draw the conveyor into said chamber over said hearth and along said trackways. When the conveyor has been moved entirely into the oven, the same will be brought into intimate contact with the hearth by reason of the wheels 44 automatically seating themselves in their respective depressions. When the product is baked the motor is reversed and the product is withdrawn a suitable receptacle being seated near the drum to receive the product when the same are delivered to the drum.

While I have described a preferred embodiment of my invention, involving certain details of construction, it will be understood that I reserve the right to modify the construction in so far as minor details are concerned without departing from the spirit of the invention and scope of the claims.

What I claim as new is:

1. In a baker's oven in combination, an enclosed hearth having an opening at one end, a furnace heating said hearth, a reversible conveyor entering into said opening and counterbalanced means for moving said conveyor over said hearth.

2. In a baker's oven in combination, an enclosed hearth having an opening at one end, a furnace heating said hearth, a reversible conveyor entering through said opening and movable over said hearth, and counterbalanced means for moving and guiding said conveyor.

3. In a baker's oven in combination, an enclosed hearth having an opening at one end, a furnace heating said hearth, a reversible flexible conveyor entering through said opening, a drum at one end of said hearth on which said conveyor is wound, and counterbalanced means for driving said drum.

4. In a baker's oven in combination, an enclosed hearth having an opening at one end, a furnace heating said hearth, a reversible flexible conveyor entering through said opening, a drum at one end of said hearth on which said conveyor is wound, means for driving said drum, and a weight connected to the free end of said conveyor.

5. In a baker's oven in combination, an enlarged hearth having an opening at one end, a furnace heating said hearth, a reversible flexible conveyor entering through said opening, a drum at one end of said hearth on which said conveyor is wound, reduction gearing connected to said drum, a weight connected to the opposite end of said conveyor, and means driving said drum through said reduction gearing.

6. In a baker's oven in combination, an enclosed hearth having an opening at one end, a furnace heating said hearth, a reversible flexible conveyor entering through said opening, and adapted to pass over said hearth in spaced relation thereto, means for bringing said conveyor into intimate contact with said hearth, and means for moving said conveyor over the hearth.

7. In a baker's oven in combination, an enclosed hearth having an opening at one end, a furnace heating said hearth, a reversible flexible conveyor entering through said opening and adapted to pass over said hearth in spaced relation thereto, means for bringing said conveyor into intimate contact with said hearth only when fully within the opening, and means for moving said conveyor over said hearth.

8. In a baker's oven in combination, an enclosed hearth having an opening at one end, a furnace heating said hearth, a flexible reversible conveyor having a tray movable over said hearth, trackways on the hearth, said trackways having staggered depressions therein, and complementally staggered rollers on the tray for engagement with said depressions.

9. In a baker's oven in combination, an enclosed hearth having an opening at one end, a furnace heating said hearth, a reversible flexible conveyor movable over said hearth, a drum at said opening over which said conveyor is wound, means for driving the drum, and a weight connected to the free end of the conveyor.

10. In a baker's oven in combination, an enclosed hearth having an opening at one end, a furnace heating said hearth, a flexible reversible conveyor having a tray movable over said hearth, trackways on the hearth, said trackways having staggered depressions of varying widths therein, and rollers complementally staggered and of varying widths for engagement in said depressions.

In witness whereof, I have hereunto set my hand this 19th day of March, 1921.

WILLIAM F. PETERSEN.

Witnesses:
FRANK D. THOMASON,
VIOLET WARDELL.